(12) United States Patent
Shimizu

(10) Patent No.: US 7,720,624 B2
(45) Date of Patent: May 18, 2010

(54) INFORMATION PROCESSING METHOD, INFORMATION PROCESSING APPARATUS AND PROGRAM

(75) Inventor: Kazuma Shimizu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

(21) Appl. No.: 11/842,430

(22) Filed: Aug. 21, 2007

(65) Prior Publication Data

US 2008/0052036 A1      Feb. 28, 2008

(30) Foreign Application Priority Data

Aug. 23, 2006   (JP)   ............................. 2006-226472
Aug. 10, 2007   (JP)   ............................. 2007-209596

(51) Int. Cl.
*G01N 37/00*      (2006.01)
*G01B 21/28*      (2006.01)

(52) U.S. Cl. .......................... 702/81; 702/82; 702/155; 702/156; 703/1

(58) Field of Classification Search .................. 702/81, 702/82, 155, 156, 167, 168; 703/1; 700/182; 250/307, 311; 452/157
See application file for complete search history.

(56) References Cited

U.S. PATENT DOCUMENTS

| 4,918,627 | A | * | 4/1990 | Garcia et al. | .................. 702/82 |
| 4,937,768 | A | * | 6/1990 | Carver et al. | .................. 703/1 |
| 5,960,379 | A | * | 9/1999 | Shimizu et al. | ............. 702/155 |

FOREIGN PATENT DOCUMENTS

| JP | 8-082575 | 3/1996 |
| JP | 8-190575 | 7/1996 |
| JP | 2000-235594 | 8/2000 |
| JP | 2001-082951 | 3/2001 |

\* cited by examiner

*Primary Examiner*—John H Le
(74) *Attorney, Agent, or Firm*—Fitzpatrick, Cella, Harper & Scinto

(57) ABSTRACT

An information processing method, an information processing apparatus and a program can prevent errors from arising when associating point group data obtained by actually measuring an item such as a metal part and design data defining the item. The characteristic value representing the profile of a face of the design data defining the item and the characteristic value computationally determined from the point group data obtained by actually measuring the item are compared and associated with each other.

7 Claims, 11 Drawing Sheets

Shell(SOLID SECTION)
Shell(HOLLOW SECTION)

Vertex
Edge
Loop
Face
Solid Model

FIG. 7A
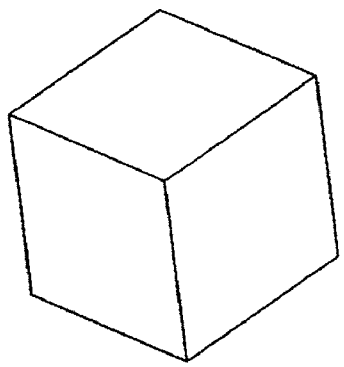
3D PROFILE EXAMPLE
FIG. 7B
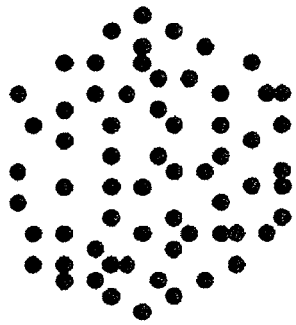
POINT GROUP DATA
DISPLAY EXAMPLE
FIG. 7C
| X-COORDINATE | Y-COORDINATE | Z-COORDINATE | POINT ATTRIBUTE 1 | . . . . |
|---|---|---|---|---|
| 0.01 | 1.03 | 2.01 | | |
| 0.02 | 1.05 | 3.04 | | |
| 0.01 | 1.04 | 4.03 | | |
| 0.02 | 0.99 | 5.01 | | |
| 0.04 | 0.98 | 5.98 | | |
POINT GROUP DATA EXPRESSION EXAMPLE

INFORMATION PROCESSING METHOD, INFORMATION PROCESSING APPARATUS AND PROGRAM

BACKGROUND OF THE INVENTION

1. Field of the Invention

The present invention generally relates to the information processing technology. More particularly, the present invention relates to an information processing technique of using design data for expressing the profile defined for an object to be examined and point group data obtained by actually measuring the profile of the object.

2. Description of the Related Art

In the process of designing a product, it is a general practice to use a CAD apparatus (2D-CAD apparatus or 3D-CAD apparatus) in order to design an object having a three-dimensional profile (to be referred to simply as "part" hereinafter). The designer of a part conveys design/manufacture information and the design purposes of the part to downstream steps typically including a manufacturing step by inputting attribute information on the part such as dimensions, dimensional tolerances, geometric tolerances, footnotes and signs on a CAD model, which may be a 3D model or 2D drawings.

The downstream steps that may typically include a step of designing a metal mold confirm the design information, referring to the CAD model from the upstream side. After the confirmation, the metal mold, the NC programming, the metal mold manufacture, the molding and the molded products or the metal mold or molds will be inspected.

In the inspection step, a measurement operation is conducted, based on the design information such as dimensional tolerances directed typically in drawings, by means of a contact type coordinate measuring machine (CMM), a non-contact type CMM or a manual measuring machine such as a microscope. It is a general practice that an identifier is affixed to each dimension to record measured values with their respective identifiers so that the measured results can be verified on the drawings.

For such inspections, Japanese Patent Application Laid-Open No. H08-082575 discloses a technique for improving the efficiency of measurement operations by automating the process of totalizing the results of measurement. Japanese Patent Application Laid-Open No. H08-190575 and Japanese Patent Application Laid-Open No. 2000-235594 describe other techniques of the same category. According to these patent documents, the measurement values are output with routing data of the CMM, to which the identifiers of dimensions are added, and the results of measurement are read into the CAD apparatus and the dimensions are compared with the dimensions on the CAD drawings for collation. Such techniques are adopted for a commercially available CAD system.

On the other hand, Japanese Patent Application Laid-Open No. 2001-82951 proposes a method of aligning a CAD model and corresponding point group data obtained from a non-contact type CMM. Recently, pieces of software for interactively displaying the quantity of discrepancy between CAD data and corresponding point group data and then displaying the point group with a color that varies as a function of the quantity of discrepancy have been marketed.

However, it is necessary to prepare a measurement program for each site of measurement when utilizing an automatic measuring machine such as a CMM. Additionally, it is time consuming to use a manual measurement machine. Particularly, when the number of sites of measurement is large, it may sometimes take several days for the measurements to become an obstacle of development of a product. Thus, when a contact type measurement technique is employed, the measurement operation itself is time consuming. Then, it is normally difficult to satisfy both the requirements of cost and those of delivery date simply by automating the operation of processing measurement data as disclosed in the above cited patent documents including Japanese Patent Application Laid-Open No. H08-082575, Japanese Patent Application Laid-Open No. H08-190575 and Japanese Patent Application Laid-Open No. 2000-235594.

On the other hand, it is possible to reduce the time required for measurement by employing a technique of comparing the point group data obtained from the profile of a part by means of a non-contact type measurement machine and the corresponding CAD model for collation. With such a technique, the results of measurement of a part are evaluated relative to the attribute information such as dimensions of the part affixed to the CAD model. For this purpose, a cross section of the point group data that is aligned with the CAD model is taken for the measurement or faces and edges are prepared from the point group data and some of the faces and the edges are interactively selected for measurement. Then again, it is time consuming to evaluate the results of measurement on a dimension by dimension basis.

A technique disclosed in Japanese Patent Application Laid-Open No. 2001-82951 utilizes the distance between point group data and profile elements such as dimensions when associating them with each other. However, in general, the profile of a part to be measured shows errors relative to the profile of the CAD drawings. Therefore, with a technique of simply utilizing the distance between CAD drawings and a point group, the operation of associating the point group with the profile elements can involve errors. If errors are involved in the operation of associating them with each other, it is consequently difficult to conduct an accurate inspection.

Additionally, some profile elements may be unsuitable for measurement because they show a large error relative to the corresponding point group. It is difficult to give an appropriate determination when the determination is not made at a site suitable for measurement or at a measurement point that reflects the designer's intention.

In view of the above-identified problems, it is therefore the object of the present invention to provide a technique for preventing errors from arising when associating actual measurement data of a part with model data.

SUMMARY OF THE INVENTION

In an aspect of the present invention, there is provided an information processing method for associating point group data obtained by measuring an object of measurement having a plurality of faces by means of a three-dimensional profile measurement instrument with design data for the object of measurement, the method including: a definition step of defining a type of face and a characteristic value of the design data representing a profile of each of the plurality of faces from the design data for the object of measurement; a computation step of computationally determining a type of face and a characteristic value of the point group data representing a profile of a face for an indicated point selected from the point group data from information of the point group data of an area surrounding the indicated point; a selection step of selecting a face closest to the indicated point from the plurality of faces of the design data; a determination step of determining if the type of face of the point group data determined for the indicated point and the type of face of the design data defined for the selected face of the design data agree with each other and the difference between the characteristic value determined for the indicated point and the characteristic value defined for the selected face of the design data is within a tolerance range; and an association step of associating the indicated point and the selected face of the design data with each other when the types of face agree with each other and the difference of the characteristic values is within the tolerance range.

In another aspect of the present invention, there is provided an information processing apparatus for associating point group data obtained by measuring an object of measurement having a plurality of faces by means of a three-dimensional profile measurement instrument with design data for the object of measurement, the apparatus including: a definition unit that defines a type of face and a characteristic value of the design data representing a profile of each of the plurality of faces from the design data for the object of measurement; a computation unit that computationally determines a type of face and a characteristic value of the point group data representing a profile of a face for an indicated point selected from the point group data from information of the point group data of an area surrounding the indicated point; a selection unit that selects a face closest to the indicated point from the plurality of faces of the design data; a determination unit that determines if the type of face of the point group data determined for the indicated point and the type of face of the design data defined for the selected face of the design data agree with each other and the difference between the characteristic value determined for the indicated point and the characteristic value defined for the selected face of the design data is within a tolerance range; and an association unit that associates the indicated point and the selected face of the design data with each other when the types of face agree with each other and the difference of the characteristic values is within the tolerance range.

Thus, according to the present invention, the association process of associating a face of a part of design data and point group data obtained by measuring the part with each other is based on the characteristic value of the profile of the face so that the accuracy of the association process is remarkably improved.

Further features of the present invention will become apparent from the following description of exemplary embodiments with reference to the attached drawings.

BRIEF DESCRIPTION OF THE DRAWINGS

FIGS. 7A, 7B and 7C are schematic illustrations of examples of point group data of the embodiment of FIG. 2.

DESCRIPTION OF THE EMBODIMENTS

Figure 1:
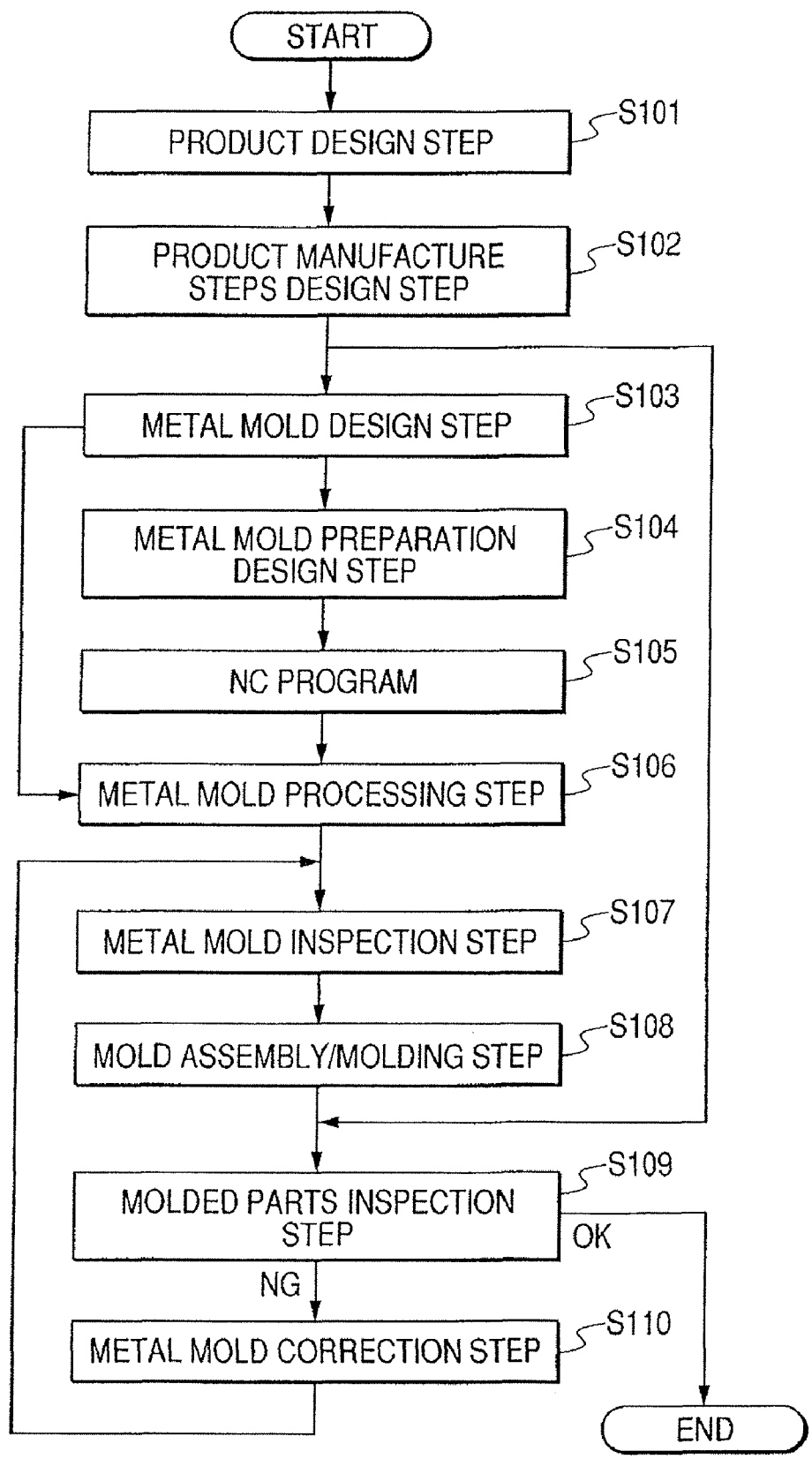
FIG. 1 is a flowchart of the sequence of metal mold production of a molded part by means of an embodiment of information processing method according to the present invention.

Now, the present invention will be described in greater detail by referring to the accompanying drawings that illustrate an exemplary embodiment of the invention, which is to be applied to production of a metal mold for producing a molded part. FIG. 1 is a flowchart of the sequence of metal mold production of a molded part by means of the embodiment.

In the metal mold production, firstly the product is designed and the design drawings for the individual parts that constitute the product are drawn (Step S101). Each design drawing of a part carries information on the dimensions and other elements necessary for preparing the part and information on the restrictions imposed on the production of the part. Each design drawing of a part is prepared by 2D-CAD or 3D-CAD. A 3D drawing prepared by 3D-CAD contains attribute information such as information on the profiles and the dimensional tolerances relating to the part. The dimensional tolerances can be associated with the profiles of faces, edges and dots and utilized in the instructions for the inspection of the molded part and the accuracy of the metal mold.

When the product design step is over, the aspect of manufacturing the product such as assembling the metal mold and molding of the product are studied and process charts are prepared for each part relating to the manufacturing process (Step S102). The process chart of each part prepared by 2D-CAD or 3D-CAD contains information on detailed instructions for inspection in addition to information necessary for preparing the part. Such detailed instructions for inspection include instructions for numbering the measurement items such as measurement of dimensions and dimensional tolerances and instructions for measurement points and measurement methods for each measurement item. Such detailed information on instructions for inspection can be associated with dimensional tolerances on CAD.

When the process charts (process drawings and metal mold specifications) of each part are prepared, a metal mold is designed according to the process charts and drawings are prepared on the part (Step S103). The metal mold drawings contain information necessary for preparing the metal mold and the restrictive requirements. The metal mold drawings are prepared by 2D-CAD or 3D-CAD. The metal mold drawings prepared by 3D-CAD contains attribute information such as information on the profiles and the dimensional tolerances relating to the part.

Then, the step of manufacturing the metal mold is studied on the basis of the prepared metal mold drawings and process charts for preparing the metal mold are prepared (Step S104).

The metal mold is produced by way of an NC (numerical control) process that is an automated process under numerical control and a manual universal process. For the NC process, instructions are given to prepare an NC program.

As the metal mold drawings are prepared, an NC program is prepared on the basis of the drawings (Step S105) and the metal mold parts are produced typically by means of machine tools by executing the prepared NC program (Step S106). As the metal mold parts are produced, the parts are inspected (Step S107) according to the information on the metal mold drawings that are prepared in advance (Step S103). Then, the metal mold parts that pass the inspection are assembled and the product is molded by means of the assembled metal mold (Step S108).

Subsequently, the molded parts are inspected (Step S109) according to the design drawings prepared in advance for the parts and the process chart for manufacturing the product (Steps S101, S102). The process sequence ends when the parts pass the inspection. If any of the parts does not pass the inspection, the metal mold part that is short of accuracy for the molded part is modified (Step S110).

Now, the part inspection that utilizes measurement instruments and a CAD apparatus will be described below. This inspection corresponds to the inspection of the metal mold parts (Step S107) and the inspection of the molded parts (Step S109) in the above process sequence.

Figure 2:
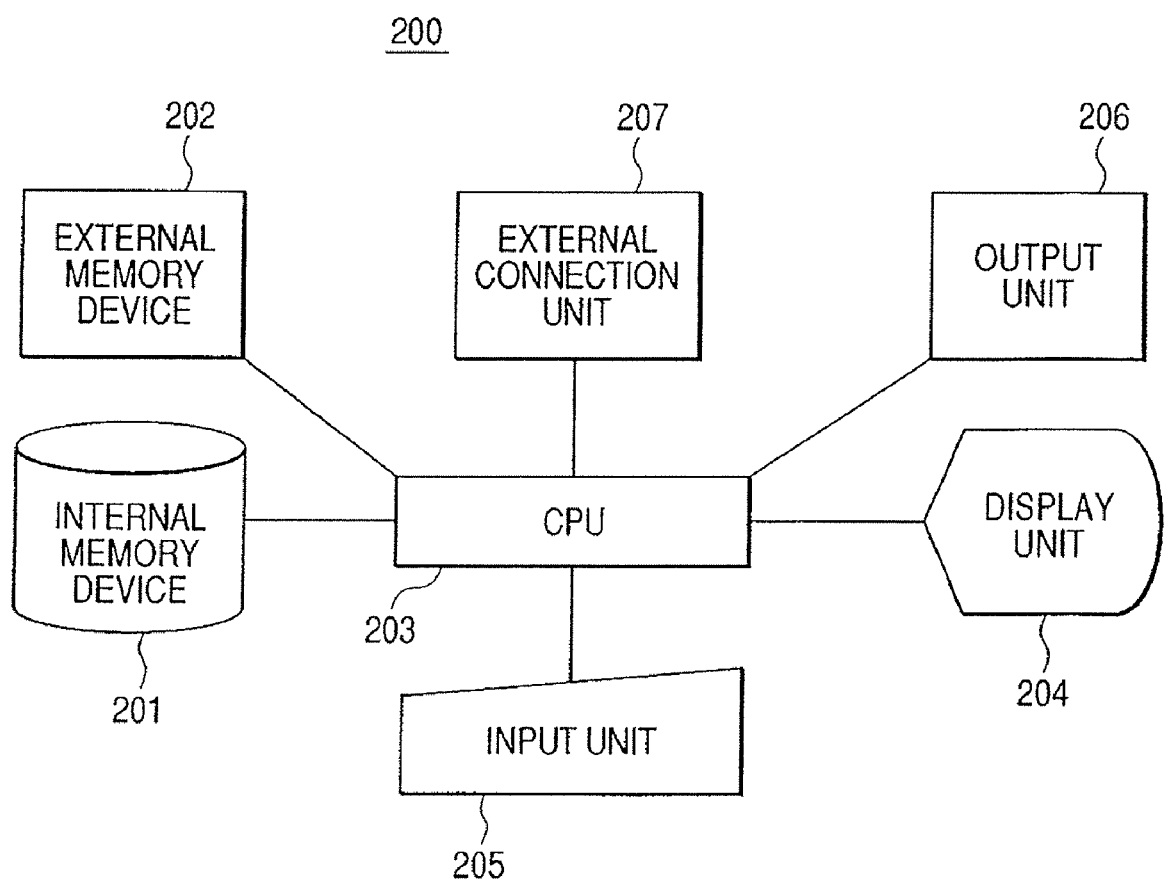
FIG. 2 is a schematic block diagram of an embodiment of information processing apparatus according to the present invention.

FIG. 2 is a schematic block diagram of an information processing apparatus 200, which may typically be a CAD apparatus, to be used for inspections. Referring to FIG. 2, an internal memory device 201 and an external memory device 202 may be semiconductor memory devices such as RAMs or magnetic memory devices for storing CAD data and CAD programs. A CPU 203 executes a process according to instructions of a CAD program. A display unit 204 displays images such as profiles of parts according to commands from the CPU 203. An input unit 205 may typically include a mouse and a keyboard to be used for giving commands to the CAD program. An output unit 206 may typically be a printer for outputting sheets of drawings according to the commands from the CPU 203. An external connection unit 207 is adapted to connect the information processing apparatus 200 to an external apparatus and control the exchange of data between the two apparatus.

Now, the processing operation of the information processing apparatus 200 will be described by referring to the flowchart of FIG. 3. Firstly, as the operator directs the input unit 205 to start the CAD program, the CAD program stored in the external memory device 202 is read into the internal memory device 201. The CPU 203 executes the read-in CAD program (Step S301).

As the operator interactively gives directions to the CPU 203 from the input unit 205 after the start of the CAD program, a CAD attribute model is generated on the internal memory device 201 and displayed on the display unit 204 as an image (Step S302). The CAD attribute model corresponds to design data according to the present invention and how the CAD attribute model is handled will be described in greater detail hereinafter. It may be so arranged that the design data is displayed as the operator operates the input unit 205 to specify a file name. In other words, it may be so arranged that the operator specifies the design data prepared and stored in the external memory device 202 in advance so as to be read into the internal memory device 201.

Additionally, as the operator interactively gives directions by way of the input unit 205, point group data that is obtained by observing a part are produced on the internal memory device 201 and displayed on the display unit 204 as an image (Step S303). Point group data includes coordinate data for each point. How point group data is handled will be described in greater detail hereinafter. It may be so arranged that point group data is displayed as the operator operates the input unit 205 to specify a file name as in the case of design data.

The CPU 203 computationally determines the positional relationship between the read-in design data and the point group data and associates the design data with the point group data (Step S304). This processing operation will be described in greater detail hereinafter. The point group data is divided into groups for respective elements such as "Face" that indicates a face of the design data and so on and stored in the internal memory device 201

The CPU 203 computes the measurement value that corresponds to the attribute information defined for each element such as "Face" (Step S305). This processing operation will also be described in greater detail hereinafter. For example, if attribute information relates to a "dimension", the CPU 203 computationally determines measurement points from the point group that is associated with the element to be referred to in order to compute the "dimension" and computes the distance between the determined measurement points as measurement value.

Then, the CPU 203 determines if the measurement value computed for each piece of attribute information is appropriate or not (Step S306). For example, if attribute information relates to a "dimension", the CPU 203 compares the difference between the nominal value stored in the internal memory device 201 for the dimension and the measurement value and the difference between the nominal value and the tolerance value stored in the internal memory device 201. As a result of the comparison, if the former difference is greater than the latter difference, the color of the dimension or that of the face being referred to is emphatically displayed on the display unit 204. With this arrangement, it is possible to clearly indicate the spot that failed to pass to the operator.

Finally, the operator stores the results of the measurement in the external memory device 202 by way of the input unit 205 (Step S307). It is possible to automate part or all of the processing steps from Step S301 to Step S307 by defining them as macro in advance. Particularly, when the number of pieces of attribute information is large, it is effective to replace interactive processing operations with execution of a macro.

(Explanation of Step S302)

Figure 4A:
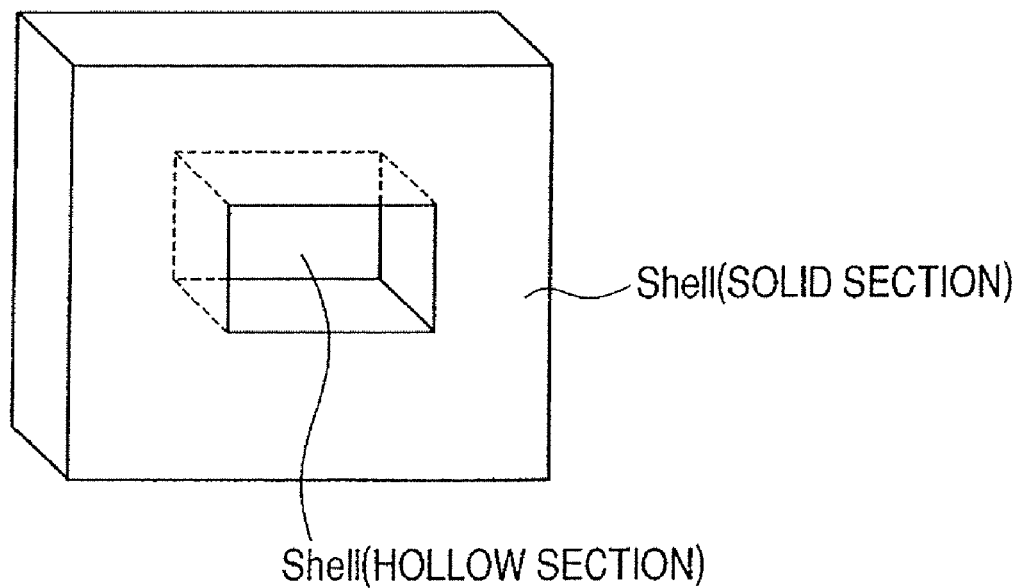
FIGS. 4A and 4B are schematic illustrations of design data that the embodiment of information processing apparatus of FIG. 2 may handle.
Figure 4B:
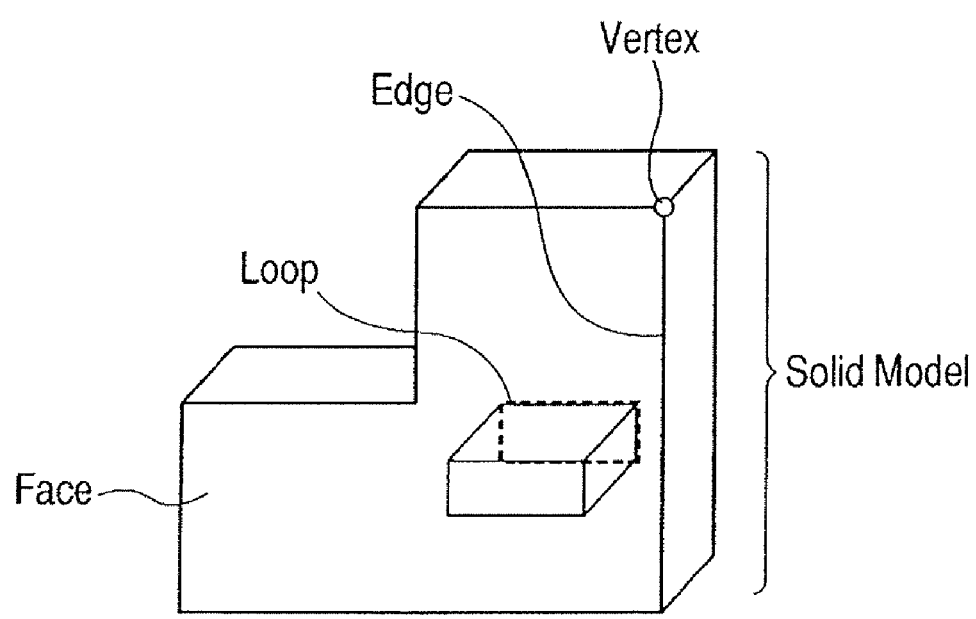
Figure 5:
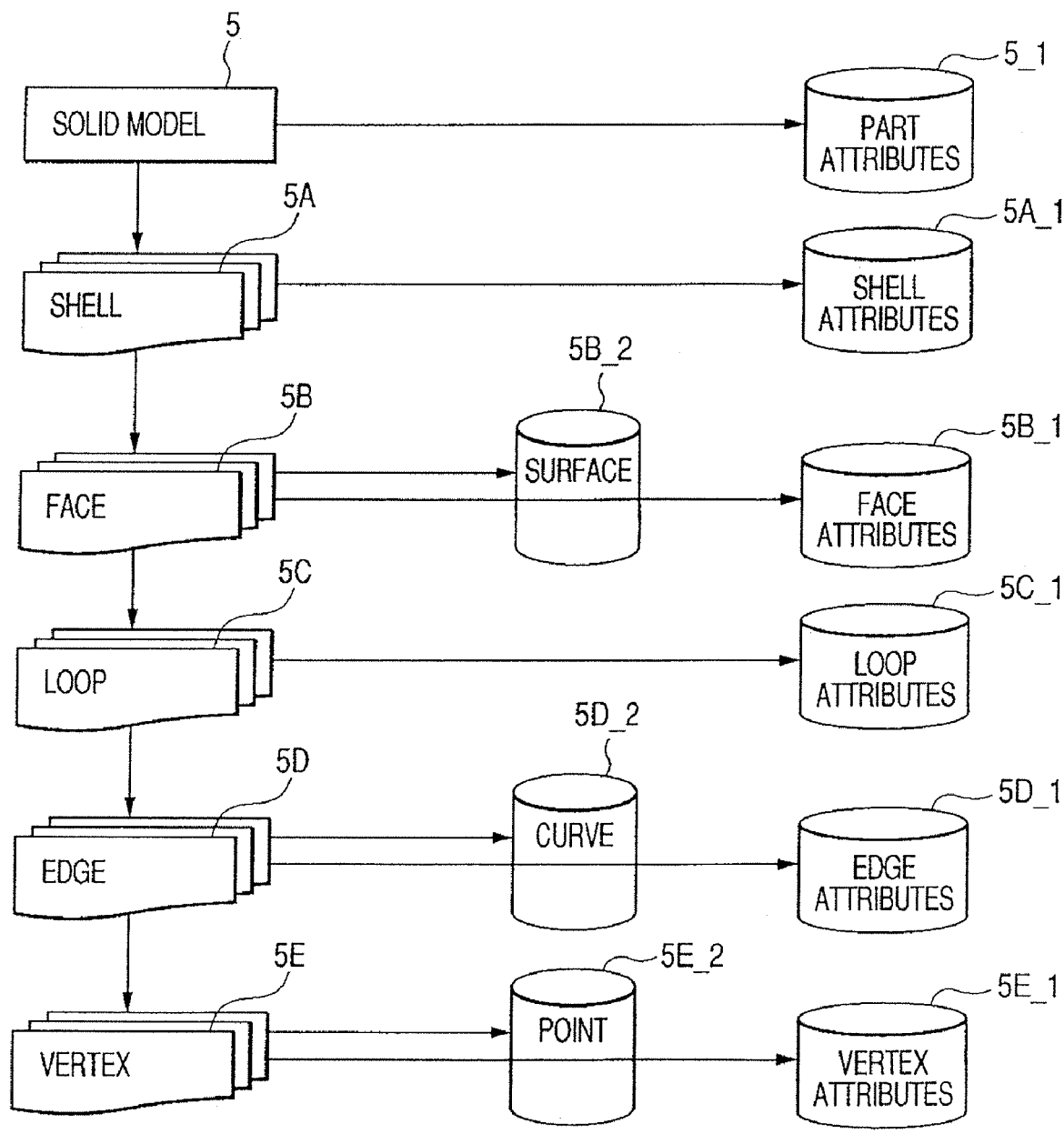
FIG. 5 is a schematic illustration of the hierarchical relationship of design data that the embodiment of information processing apparatus of FIG. 2 handles.

Now, CAD design data will be described below. FIGS. 4A and 4B schematically illustrate examples of design data. FIG. 5 is a schematic conceptual illustration of the relations of the components of design data.

The model illustrated in FIG. 4A is a model of CAD design data that relates to a solid shell, which is used as an expression format for defining the profile of a part in a three-dimensional space of CAD. The illustrated example is a model where a hollow section is formed in a solid section. Referring to FIG. 5, Solid Model that is information on the solid section includes topological information (Topology) and geometrical information (Geometry). Topological information include elements such as Face, Loop, Edge and Vertex.

Such elements are hierarchically stored in the internal memory device 201 as illustrated in FIG. 5. The hierarchy can be broken down into one or more than one Shells 5A, one or more than one Faces 5B for each Shell 5A, one or more than one Loops 5C for each Face 5B, one or more than one Edges 5D for each Loop 5C and two Vertexes 5E for each Edge 5D.

The Faces 5B in the internal memory device 201 are associated with types of face and characteristic values of design data expressing a plurality of face profiles such as plane surfaces and cylindrical surfaces as geometrical information (Surface information 5B_2). The types of face and the characteristic values of design data are defined in advance by means of the definition unit that defines types of characteristic value and characteristic values (the definition step of defining types of face and characteristic values from design data). Types (profiles) of face are referred to as types of characteristic value here and data expressing the profiles of faces such as plane surfaces, curved surfaces and cylindrical surfaces are stored. Numerical values expressing the directions of faces and those expressing the profiles of faces are referred to as characteristic values for the purpose of the present invention. More specifically, a normal vector or a unit normal vector (to be referred to as normal vector) is stored for a plane and curvatures in two directions is stored for a curved surface, whereas the radius and a direction vector of the axis are stored for a cylindrical surface in this embodiment, although the present invention is by no means limited thereto. Additionally, while types of characteristic value are stored as separate data in this embodiment, it is also possible to determine the type of a characteristic value from the characteristic value.

Alternatively, types of characteristic value and characteristic values may be defined by computations, executing a program in the CPU 203 and using the design data stored in the internal memory device 201. Curve information 5D_2 for expressing profiles such as straight lines and circular arcs is associated with Edge 5D as geometrical information. Point information 5E_2 on coordinate values in a three-dimensional space is associated with Vertex 5E as geometrical information.

Additionally, the topological elements of Shell 5A, Face 5B, Loop 5C, Edge 5D and Vertex 5E are associated respectively with pieces of attribute information 5A_1/5B_1/5C_1/5D_1/5E_1 including dimensions in the internal memory device 201.

Figure 6:
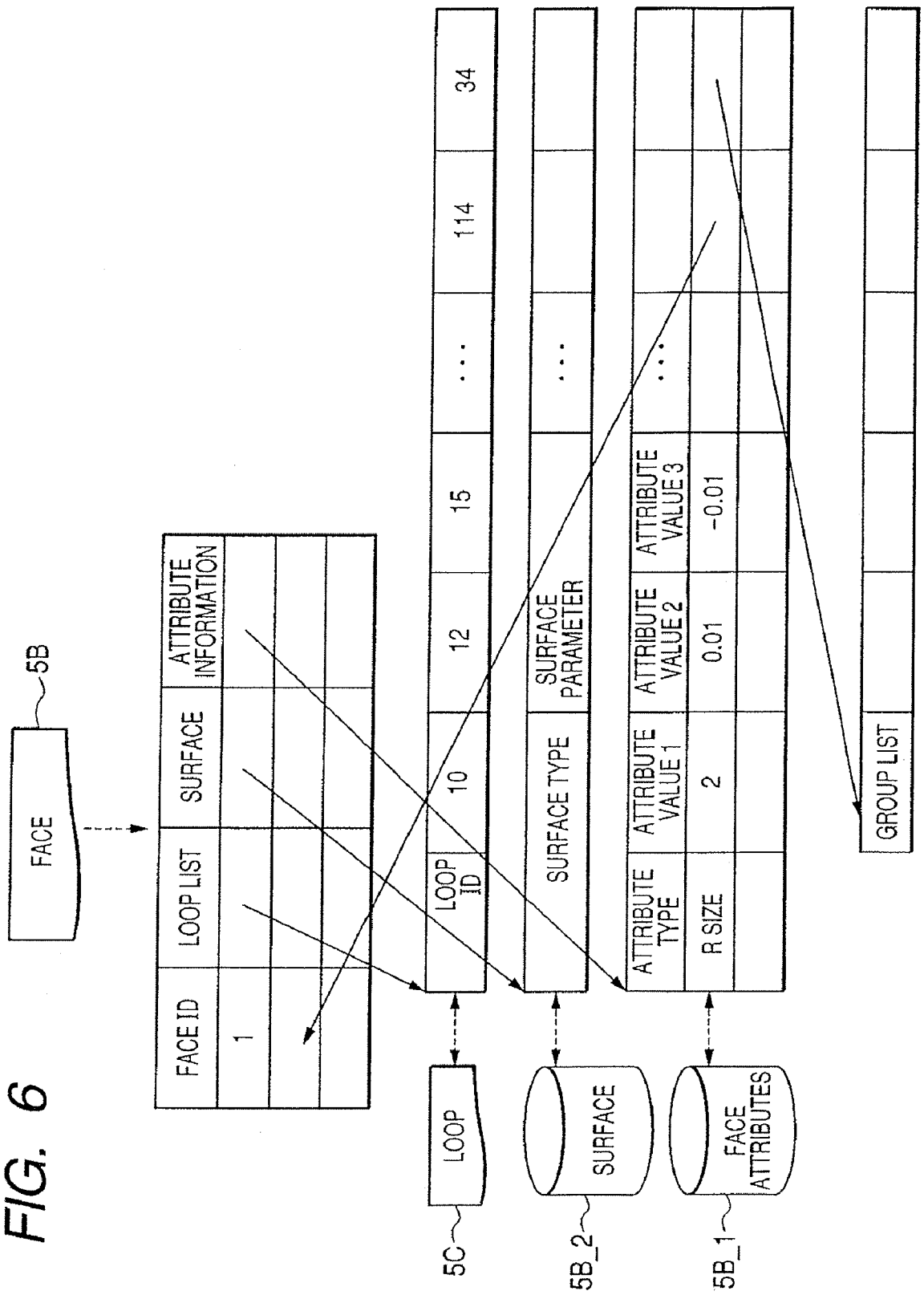
FIG. 6 is a schematic illustration of data relating to a face of the design data in the internal memory device of the embodiment of FIG. 2.

Now, the format of storage in the internal memory device 201 will be described below by taking Face 5B as example. FIG. 6 is a schematic illustration of the format of storage of Face 5B in the internal memory device 201. Face 5B includes Face ID for identifying a face of design data model of CAD, a pointer to Loop 5C for defining the face, a pointer to Surface Information 5B_2 for expressing the profile of the face and a pointer to the attribute information 5B_1 of Face.

Loop 5C stores the identification information ("Loop ID") of all the Loops that constitute a face in the form of a list. Surface information 5B_2 includes the type of characteristic value representing the type of a face (Surface Type), and the characteristic value that is a parameter value (Surface Parameter). Face attribute information 5B_1 includes "attribute type" such as a dimension and "attribute value" according to the type. The attribute value includes a pointer for Face 5B and a pointer for a group to which the attribute belongs.

(Explanation of Step S303)

Now, point group data will be described by referring to FIGS. 7A through 7C. Point group data three-dimensionally expresses the surface or inside of an object of measurement such as a part to be molded by means of points and can be obtained by means of a three-dimensional profile measurement instrument.

For example, point group data is obtained from an image of the object of measurement typically by means of a CCD camera after subjecting them to image processing and data processing.

FIG. 7B illustrates point group data obtained from a part having a 3D profile as illustrated in FIG. 7A. The point group data is displayed on the display unit 204 as a set of a plurality of points. Additionally, the point group data is stored typically in the internal memory device 201 in a data format for including three-dimensional coordinate values for the "X-coordinate", the "Y-coordinate" and "Z-coordinate" as illustrated in FIG. 7C.

(Explanation of Step S304)

Figure 3:
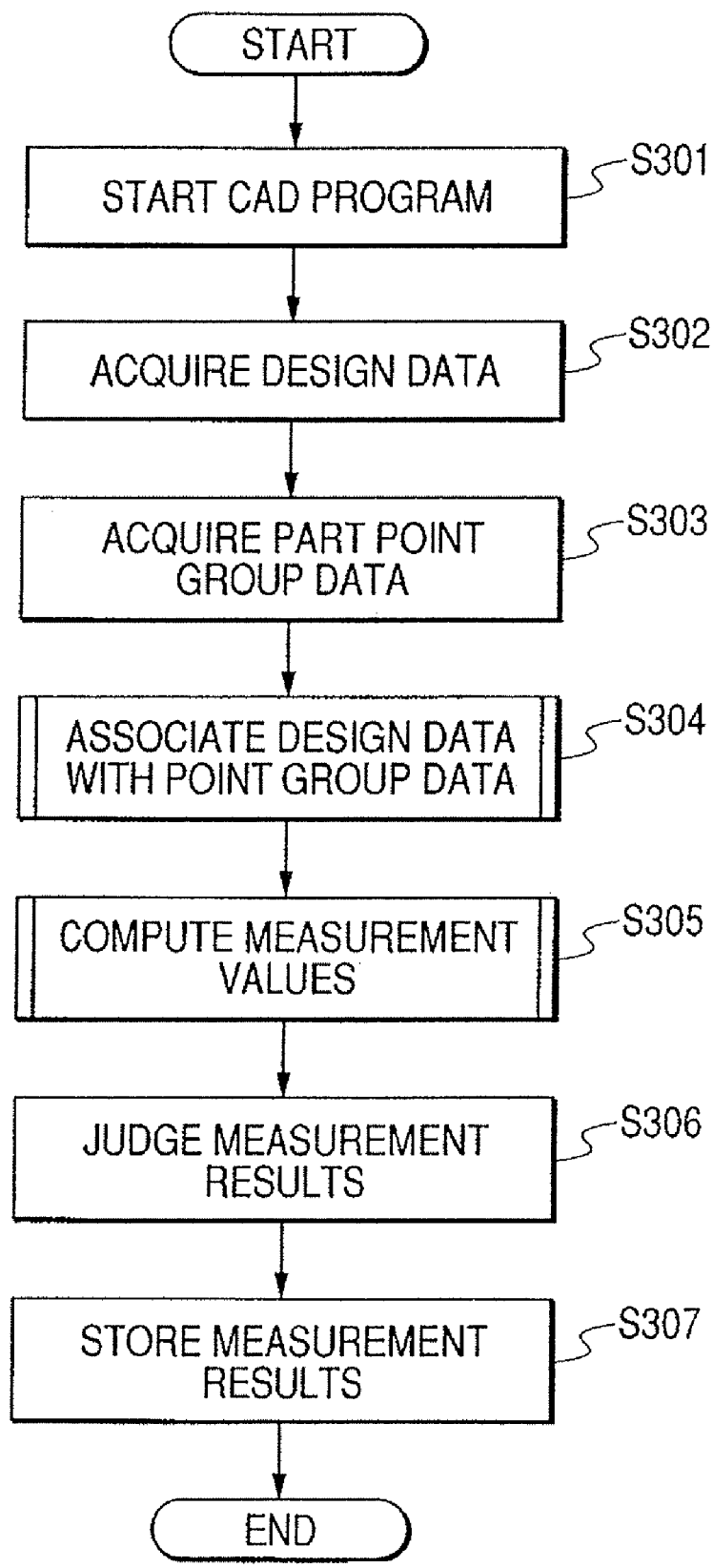
FIG. 3 is a flowchart of the processing sequence of the embodiment of information processing apparatus of FIG. 2.

Now, the operation of associating design data with point group data (FIG. 3: S304) will be described by referring FIGS. 8, 9, 10 and 11 and the flowchart of FIG. 12. In the instance described below, design data and point group data are aligned and subsequently each of the faces in the design data is associated with a point group.

Figure 8:
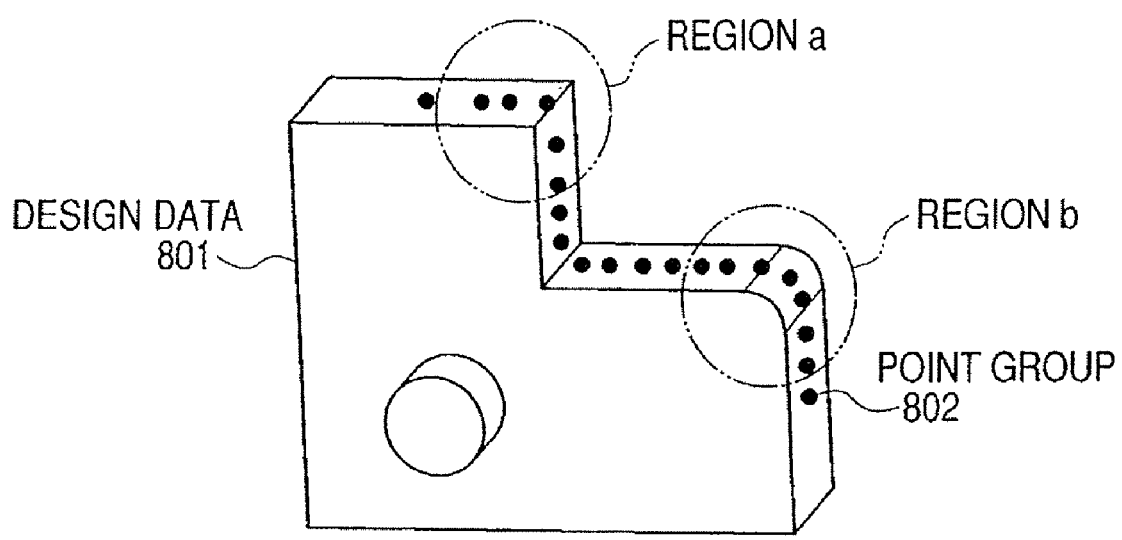
FIG. 8 is a schematic illustration of the alignment of point group data and design data in the embodiment of FIG. 2.
Figure 9:
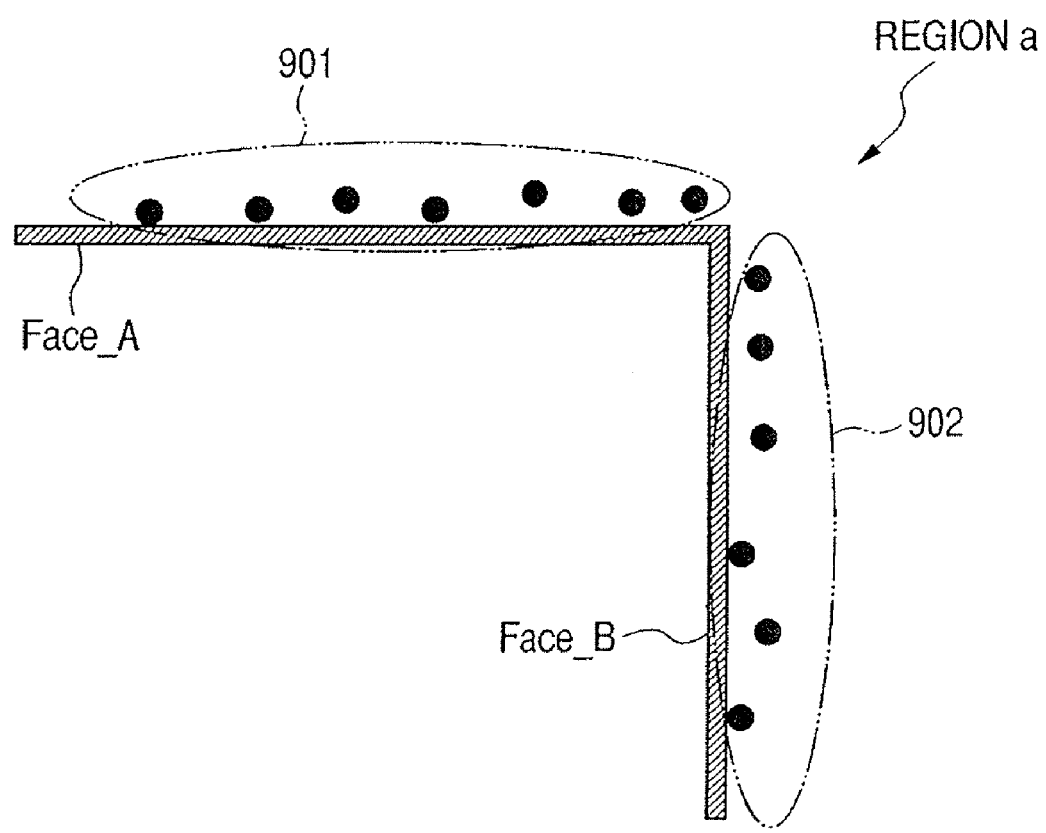
FIG. 9 is a schematic illustration of an example of association of point group data and design data in the embodiment of FIG. 2.

FIG. 8 is a schematic illustration of an example of alignment of point group 802 and design data 801. For the alignment, the CPU 203 executes a program to operate as an alignment unit and determines the sum of the squares of the distances between the individual points of the point group 802 and the corresponding respective design data. Then, it aligns the point group 802 and the design data 801 at a position that minimizes the sum of the squares (FIG. 12: Step S311 (alignment step)). The operator can make the alignment reflect the design concept by specifying the faces and/or part of the point group 802 as objects of computations for the alignment. This arrangement can reduce the time to be spent for computations.

After the above alignment step, each of the points of the point group 802 is associated with a face in the design data. When each point is associated with a face in the design data that is closest to the point, the point group can be associated with a wrong face in the design data because of the errors that normally exist between the point group data obtained by actually measuring the part and the design data of the part. In this embodiment, characteristic values are extracted from the point group data and compares with the characteristic values of the design data to prevent such wrong associations from taking place.

Now, the association process utilizing characteristic values will be described in detail below. Firstly, the CPU 203 executes a program to select an indicated point from the points of the point group data (Step S312: indicated point selection step). An indicated point refers to a point selected from point group data. The points of point group data will be sequentially selected. The selection may be made automatically as the CPU 203 executes a program or made manually. Basically, all the points are sequentially selected for association. However, the data may be weighted in such a way that only an important part of the data is selected by thinning out the rest, which are less important, so that the data processing operation may be simplified.

Additionally, the CPU 203 determines the profile of the face where the indicated point is located according to the information on the points near the selected indicated point. In other words, the CPU 203 executes a program to operate as a computation unit that computationally determines the types of face and the characteristic value that express the profile according to the information of the point group data of an area surrounding the indicated point. Thus, the computation unit computationally determines the types of face and the characteristic value of the point group data that express the profile according to the information of the point group data of an area surrounding the indicated point. (Step S313: step of computationally determining characteristic values and types of characteristic value). Numerical values expressing the directions of faces and those expressing the profiles of faces are referred to as characteristic values for the purpose of the present invention. A known technique of determining the normal vector of a face defined by the nearest three points in a three-dimensional coordinate system is used for this computation method. Since these processing techniques are widely well known, they will not be described here any further. Thus, as a result, when the approximated profile is a plane, the normal vector is typically computationally determined as a characteristic value. When, on the other hand, the approximated profile is a cylindrical surface, the radius and the direction vector of the axis are typically computationally determined as characteristic values. When the approximated profile is a curved surface, the curvature is typically computationally determined as a characteristic value. However, some other characteristic value or values may be used so long as the direction of the face and/or the profile is expressed by the value or values, whichever appropriate. A normal vector or a unit normal vector (to be referred to as normal vector) is computationally determined for a plane and curvatures in two directions is computationally determined for a curved surface, whereas the radius and a direction vector of the axis are computationally determined for a cylindrical surface in this embodiment, although the present invention is by no means limited thereto. Types (profiles) of face are referred to as types of characteristic value here and data expressing the profiles of faces such as plane surfaces, curved surfaces and cylindrical surfaces are computationally determined. Additionally, while types of characteristic value are computationally determined as separate data in this embodiment, it is also possible to determine the type of a characteristic value from the characteristic value.

Subsequently, the CPU 203 executes a program to operate as a selection unit that selects a face of the design data and selects the face closest from the indicated point (Step S318) (step of selecting a face of the design data). More specifically, the CPU 203 computes the distance between the indicated point and each of the faces of the design data and selects the face showing the shortest distance.

Additionally, the CPU 203 executes a program to operate as a determination unit that determines if the selected face of the design data is appropriate or not and compares the type of characteristic value defined for the selected face of the design data and the type of characteristic value determined from the information in the indicated point and the point group data of the surrounding area. The type of characteristic value refers to the type (profile) of the face, which may typically be a plane, a cylindrical surface or a curved surface. If it is determined that both the type of characteristic value of the point group data and the type of characteristic value of the design data indicate a plane, it is determined that the two types of characteristic value agree with each other. If, on the other hand, it is determined that one of the types of characteristic value indicates a plane while the other one of the types of characteristic value indicates a cylindrical surface, it is determined that the two types of characteristic value do not agree with each other.

When the two types of characteristic value agree with each other as a result of the comparison (Step S319: Yes), the determination unit executes the following process immediately thereafter. Firstly, it is determined if the value obtained by comparing the characteristic value computationally determined from the information on the point group data of an area surrounding the indicated point and the corresponding defined characteristic value in the design data (to be referred to as comparison value hereinafter) is found within a tolerance range or not. The values of the tolerance range are stored in the internal memory device in advance. Then, it is determined if the selected face of the design data is appropriate or not (step of determining if the selected face of the design data is appropriate or not). If it is determined that the comparison value of the characteristic values is found within the tolerance range as a result of the determination (Step S320: Yes), the association of the indicated point and the face of the design data is finalized and stored in the internal memory device 201 (Step S321 (association step)). If the characteristic value of a plane is a normal vector, the comparison value is the angular difference of the two normal vectors. If the characteristic value of a cylindrical surface is the radius of the cylinder, the comparison value is the difference of the lengths of the two radii and, if the characteristic value of a cylindrical surface is the direction vector of the axis, the comparison value is the difference of the angles of the two direction vectors. If the characteristic value of a curved surface is the curvature, the comparison value is the difference of the two curvature or the two radii of curvature.

More specifically, if the approximated profile obtained from the point group of an area surrounding the indicated point is a plane, the design data of the plane closest to the indicated point is selected. Then, the difference of angles is computationally determined from the normal vector of the plane of the design data and that of the indicated point and, if the difference is found within the tolerance range, the face of the design data and the indicated point are associated with each other.

If, on the other hand, the type of characteristic value of the indicated point and that of design data for the face closest to the indicated point do not agree with each other (Step S319: No), the face of the design data second closest to the indicated point is selected (Step S322). Then, the operation of determining if the selected face of the design data is appropriate or not is repeated. If the two types of characteristic value agree with each other but the comparison value of the characteristic values exceeds the tolerance range (Step S320: No), the process proceeds to the step of selecting the face of the design data second closest to the indicated point for determination (Step S322). The above step is repeated within a predetermined number of times until the association of the indicated point with a face of the design data is finalized.

Each time the association of an indicated point with a face of the design data is finalized (Step S321), the next indicated point is selected and the above process is repeated. All the points of the point group data may be associated or only part of the points of the point group data may be associated with a face in the design data.

Figure 10:
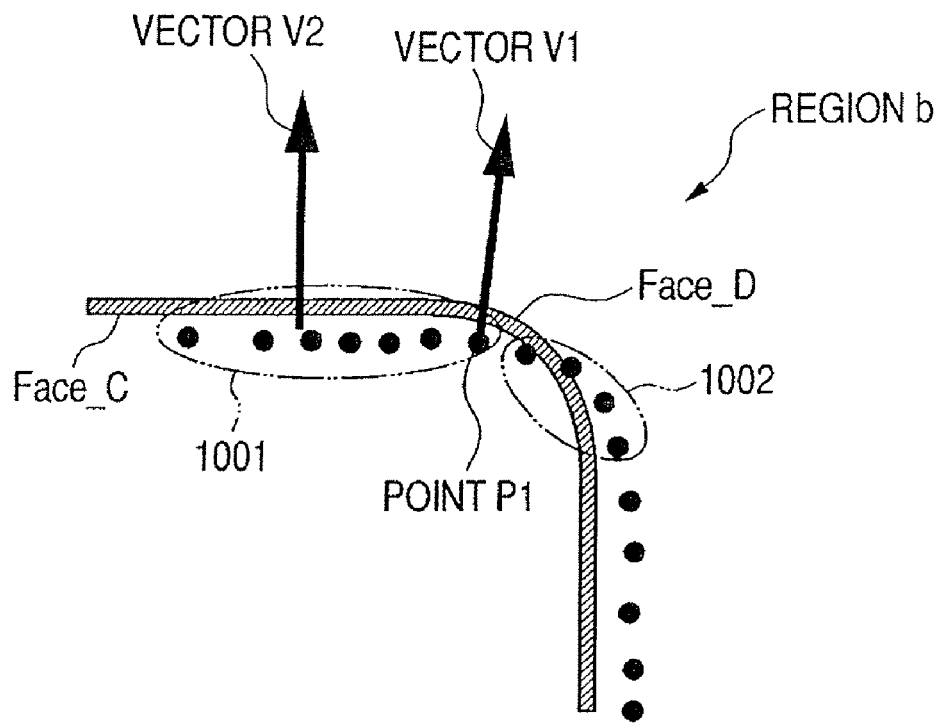
FIG. 10 is a schematic illustration of another example of association of point group data and design data in the embodiment of FIG. 2.

The above process sequence using characteristic values will be described further by way of a more specific example. FIG. 10 is a schematic illustration of the process relating to the region b in FIG. 8. Referring to FIG. 10, the point group 1001 in the region b is located near Face_C of the design data. Assume that point P1 in FIG. 10 is selected as indicated point. Normal vector V1 is computationally determined as characteristic value for the approximated profile, which is a plane. Thus, the type of characteristic value of the indicated point P1 is plane and the characteristic value thereof is that of the point having the normal vector V1.

From FIG. 10, it will be seen that the face of the design data closest to the indicated point P1 having the normal vector V1 is Face_D. However, the type of characteristic value of Face_D is cylindrical surface and hence a radius R is computationally determined as characteristic value. The type of characteristic value (cylindrical surface) of Face_D differs from the type of characteristic value (plane) of the indicated point P1. Therefore, it is determined that Face_D is not associated with the indicated point P1, although Face_D is closes to the indicated point P1.

Thus, Face_C that is next closest to the indicated point P1 relative to Face_D is selected and their types of characteristic value are compared with each other. The type of characteristic value of Face_C is plane and has normal vector V2 as characteristic value. The type of characteristic value (plane) of Face_C agrees with the type of characteristic value (plane) of the indicated point P1. If the angular difference between the two normal vectors V1 and V2 is found within the tolerance range, the association of the indicated point P1 with Face_C is finalized.

Then, the points belonging to the group 1002 illustrated in FIG. 10 are approximated by a cylindrical Face, using the point group data of a surrounding area. Face_D is closest to each of the points of the group 1002. If the difference between the radius of Face_D and the radius of the cylindrical surface approximated by the point group of the group 1002 is found within the tolerance range, each of the points of the group 1002 is associated with Face_D.

Figure 12:
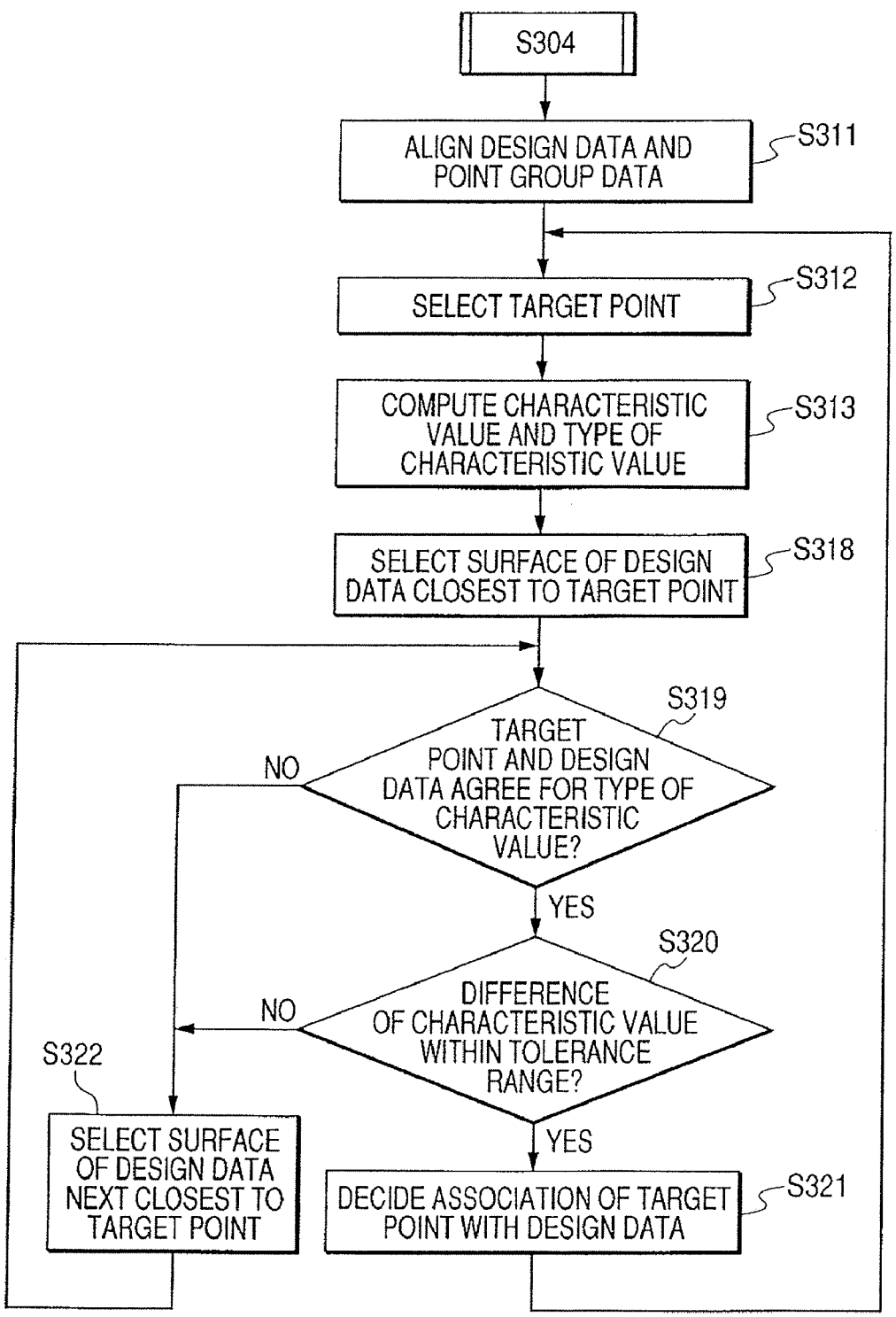
FIG. 12 is a flowchart of the detailed sequence of the association process of design data and point group data in the embodiment of FIG. 2.

As in the above-described embodiment, it is possible to roughly predict the face of design data to be associated with a point group by aligning the design data and the point data before the process of associating them with each other (FIG. 12: S311). Thus, it is possible to raise the level of accuracy of association by executing an alignment process, although the advance alignment process may be omitted when using the embodiment. In other words, each of the points of a point group may be associated with a face of the design data without executing an alignment process. A series of processes can be simplified by omitting the alignment process.

(Explanation of Step S305)

Figure 11:
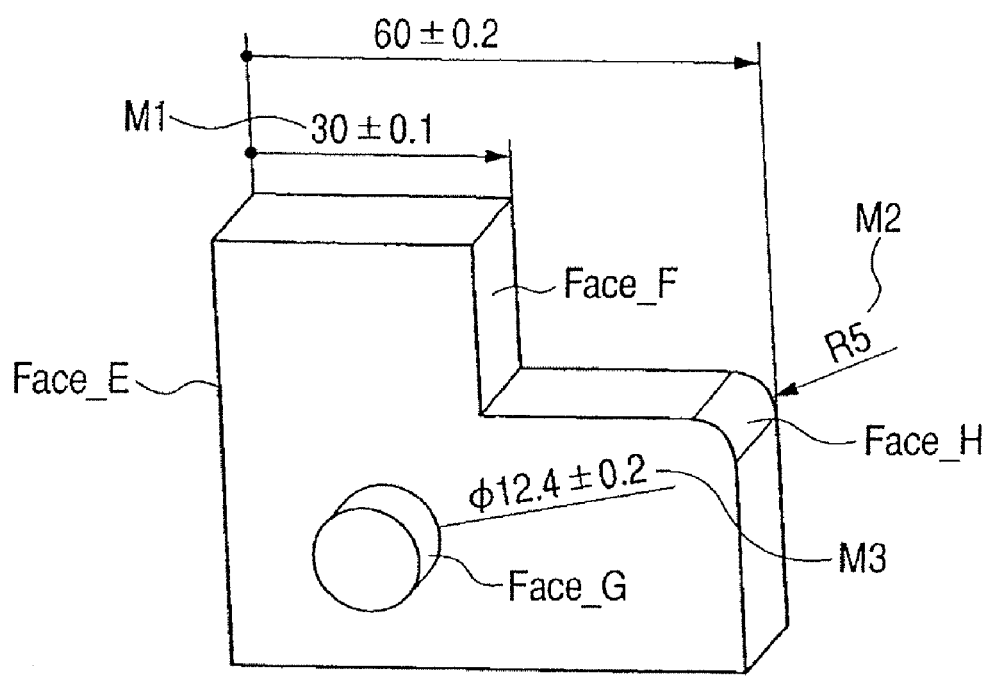
FIG. 11 is a schematic illustration of an example of computational determination of a measured value in the embodiment of FIG. 2.
Figure 13:
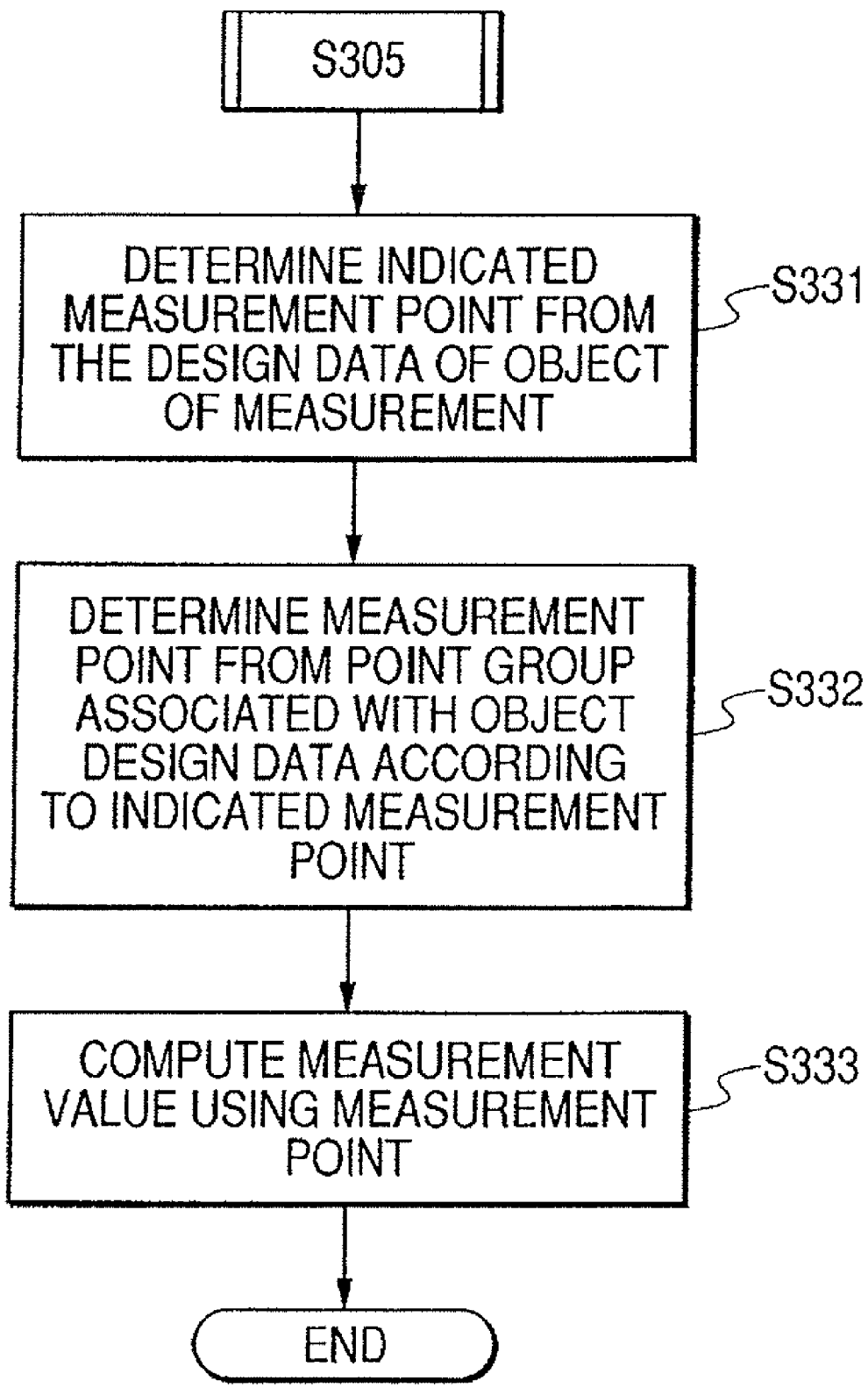
FIG. 13 is a flowchart of the detailed sequence of the computation process of a measured value in the embodiment of FIG. 2.

Now, the process of computationally determining the measured value (FIG. 3: S305) will be described by referring to the flowchart of FIG. 13. FIG. 11 is a schematic illustration of an example of computational determination of a measured value. In FIG. 11, the dimension M1 is a value led out by referring to Face_E and Face_F that are faces of the design data. The CPU 203 executes a program to operate as a specified measurement point recognition unit and recognizes respective representative points of Face_E and Face_F as specified measurement points (Step S331 (specified measurement point recognition step)).

Subsequently, the CPU 203 executes a program to operate as a measurement point selection unit and determines a measurement point on Face_E from the point group data obtained by an actual observation that are associated with Face_E according to the specified measurement point of Face_E it recognizes (Step S332 (measurement point determination step)). Similarly, the CPU 203 also determines a measurement point on Face_F from the point group data associated with Face_F in the internal memory device 201. The point in the point group that is closest to the specified measurement point may be selected as measurement point. Alternatively, the center of gravity of the point group located within the region that is specified in advance and includes the specified measurement point may be selected as measurement point.

As a result of the above process, the measurement point of Face_E and that of Face_F are determined. Then, the CPU 203 executes a program to operate as a measurement value computation unit. Subsequently, the measurement value computation unit computes the distance in the direction indicated in FIG. 11 for the dimension M1 (Step S333 (measurement value computation step)). The direction for defining a dimension is stored as attribute information on dimensions in advance in the internal memory device 201.

The other faces of design data, or Face_G and Face_H, are both cylindrical surfaces and dimensions M2 and M3 are computationally determined. If the face to be referred to for computing a dimension is a cylindrical surface, a plurality of specified measurement points are generated on a cross section that is perpendicular to the axis of the cylindrical surface and the above-described process is used to computationally determining measurement points. Then, an approximated cylindrical surface is determined by means of the method of least squares, using the determined measurement points, and then the radius of the cylindrical surface is determined as measurement value.

The operator may specify a predetermined point on the plane of the design data when determining a specified measurement point. With such an arrangement, then, the specified point is the specified measurement point to be generated by means of the above process. It is also possible for the CPU 203 to computationally determine a specified measurement point. For example, the CPU 203 can specify the center of a face as specified measurement point. Alternatively, the CPU 203 may computationally determine candidates of specified measurement point at regular intervals and selects a candidate included on the face as specified measurement point. The candidates located within a predetermined distance from the boundary of a face may be excluded when selecting a specified measurement point because the accuracy level can fall when the boundary section of a face is used for measurement.

It is also possible to computationally determine a measurement value for an element for which no attribute information such one or more than one dimensions is specified in the design data. For example, if there is a face for which no attribute information is specified, the specified measurement point may be computationally determined by means of the above-described method so that it is possible to determine a measurement point from the specified measurement point and the point group data associated with the face. Then, the distance between the determined measurement point and the specified measurement point of the target Face of the design data and hence the error between the point group and the design data is determined as measurement value. According to the above technique that omits the attribute information, the inspection process can be made move efficient.

It is also possible to use a plurality of specified measurement point for computationally determining a measurement value. Additionally, the distances from an element such as a face to all the points of the point group associated with the element may be determined. Then, the maximum value or the average value of the determined distances or the predetermined range of dispersion from the average value of the distances arranged in the ascending order may be defined as measurement value.

It is also possible to select a spot that operates as reference point from the design data and define a plurality of tolerance values as a function of the distance from the reference point to an element such as a face. With this arrangement, it is possible to alter the reference value for accepting or rejecting a measurement value as a function of the distance from the reference point. For example, it is possible to define a tolerance value for a face that increases stepwise as a function of the distance from a reference point. Such an arrangement is suitable for an application where the accuracy of inspection is desired to be less rigorous for a face located remote from the reference point than for a face located close to the reference point. If the measurement value is determined to be out of the tolerance value of an element, which may be a face, an identifier such as a dimension label is affixed to the element so as to be able to display the result of determination and make the result visually recognizable on the display unit 204. With the above-described technique of providing a plurality of reference values as a function of the distance from a reference point, it is possible to make an advantageous determination matches the ordinary tolerance typically defined in JIS from an engineering point of view.

Thus, with the above-described embodiment, the association of design data and point group data is determined on the basis of their characteristic values so that it is possible to improve the accuracy of association of a point group with a face of design data. Then, it is possible to prevent design data from being associated with a point group if they do not correspond to each other but located close to each other to consequently improve the reliability of inspection.

Other Embodiments

While point group data is used in the above-described embodiment as data for expressing the profile of a part that is an object of inspection, the measure for expressing the profile of a part is by no means limited to point group data for the purpose of the present invention. Point group data may be replaced by voxel data adapted to express a profile by means of a set of small cubes. Then, it is possible to improve the efficiency of inspection applications by handling the center of voxel data as point.

The scope of application of the present invention is by no means limited to inspection processes of molded parts and the present invention can be applied to inspection processes of various items. Thus, the present invention can find suitable applications for supporting computer processes of evaluating individual pieces of attribute information of CAD, which may typically be dimensions and dimensional tolerances.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-226472, filed Aug. 23, 2006, and 2007-209596, filed Aug. 10, 2007, which are hereby incorporated by reference herein in their entirety.

What is claimed is:

1. An information processing method for associating point group data obtained by measuring an object of measurement having a plurality of faces by means of a three-dimensional profile measurement instrument with design data for the object of measurement, the method comprising:
   a definition step of defining a type of face and a characteristic value of the design data representing a profile of each of the plurality of faces from the design data for the object of measurement;
   a computation step of computationally determining a type of face and a characteristic value of the point group data representing a profile of a face for an indicated point selected from the point group data from information of the point group data of an area surrounding the indicated point using a computation unit;
   a selection step of selecting a face closest to the indicated point from the plurality of faces of the design data;
   a determination step of determining if the type of face of the point group data determined for the indicated point and the type of face of the design data defined for the selected face of the design data agree with each other and the difference between the characteristic value determined for the indicated point and the characteristic value defined for the selected face of the design data is within a tolerance range; and
   an association step of associating the indicated point and the selected face of the design data with each other when the types of face agree with each other and the difference of the characteristic values is within the tolerance range.

2. The method according to claim 1, further comprising:
   a step of aligning the design data and the point group data before the selection step.

3. The method according to claim 1, wherein another indicated point different from the indicated point is selected from the point group data after the association step and the computation step, the selection step, the determination step and the association step are repeated.

4. The method according to claim 1, wherein the characteristic value representing a profile of a face is a normal vector when the face is a plane, a curvature when the face is a curved surface and a radius when the face is a cylindrical surface.

5. The method according to claim 1, further comprising:
   a step of determining a plurality of measurement points from the point group data associated with the face of the design data; and
   a step of computationally determining the measurement value that corresponds to the design data from the distances among the plurality of measurement points.

6. An information processing apparatus for associating point group data obtained by measuring an object of measurement having a plurality of faces by means of a three-dimensional profile measurement instrument with design data for the object of measurement, the apparatus comprising:
   a definition unit that defines a type of face and a characteristic value of the design data representing a profile of each of the plurality of faces from the design data for the object of measurement;
   a computation unit that computationally determines a type of face and a characteristic value of the point group data representing a profile of a face for an indicated point selected from the point group data from information of the point group data of an area surrounding the indicated point;
   a selection unit that selects a face closest to the indicated point from the plurality of faces of the design data;
   a determination unit that determines if the type of face of the point group data determined for the indicated point and the type of face of the design data defined for the selected face of the design data agree with each other and the difference between the characteristic value determined for the indicated point and the characteristic value defined for the selected face of the design data is within a tolerance range; and
   an association unit that associates the indicated point and the selected face of the design data with each other when the types of face agree with each other and the difference of the characteristic values is within the tolerance range.

7. A computer readable storage medium encoded with a machine readable program for causing a computer to operate as an information processing apparatus, the program causing the computer to perform steps including:
   a definition step of defining a type of face and a characteristic value of the design data representing a profile of each of the plurality of faces from the design data for the object of measurement;
   a computation step of computationally determining a type of face and a characteristic value of the point group data representing a profile of a face for an indicated point selected from the point group data from information of the point group data of an area surrounding the indicated point;
   a selection step of selecting a face closest to the indicated point from the plurality of faces of the design data;
   a determination step of determining if the type of face of the point group data determined for the indicated point and the type of face of the design data defined for the selected face of the design data agree with each other and the difference between the characteristic value determined for the indicated point and the characteristic value defined for the selected face of the design data is within a tolerance range; and
   an association step of associating the indicated point and the selected face of the design data with each other when the types of face agree with each other and the difference of the characteristic values is within the tolerance range.

* * * * *